United States Patent [19]

Hsieh et al.

[11] Patent Number: 4,699,962

[45] Date of Patent: Oct. 13, 1987

[54] OLEFIN POLYMERIZATION

[75] Inventors: Henry L. Hsieh; Gene H. C. Yeh, both of Bartlesville, Okla.

[73] Assignee: Phillips Petroleum Company, Bartlesville, Okla.

[21] Appl. No.: 574,831

[22] Filed: Jan. 30, 1984

[51] Int. Cl.$^4$ ................................................ C08F 4/52
[52] U.S. Cl. ..................................... 526/142; 502/117; 526/164; 526/340.4; 526/352
[58] Field of Search ............... 526/115, 122, 133, 142, 526/164

[56] References Cited

U.S. PATENT DOCUMENTS 3,179,580  4/1965  Fukui et al. ........................... 204/162
4,429,089  1/1984  Pedretti et al. ....................... 526/164
4,461,883  7/1984  Takeuchi et al. .................... 526/142

FOREIGN PATENT DOCUMENTS 827365  2/1960  United Kingdom ................ 526/164
865248  4/1961  United Kingdom ................ 526/164

OTHER PUBLICATIONS

Macromolecules, 15, 230–233 (1982).
J. Polym. Sci: Polymer Chemistry, Edition, 18, 3345–3357 (1980).

Primary Examiner—Edward J. Smith
Attorney, Agent, or Firm—J. E. Phillips

[57] ABSTRACT

A process for producing a novel-highly active lanthanide containing catalyst comprising the product produced by reacting a lanthanide hydride, a Lewis acid, and an electron donor ligand with an organoaluminum cocatalyst component and its use in the polymerization of olefins, especially olefins such as ethylene and 1,3-butadiene.

4 Claims, No Drawings

OLEFIN POLYMERIZATION

BACKGROUND OF THE INVENTION

This invention relates to a process for producing olefin polymers and to a high activity catalyst suitable for use in the process. The present invention relates to a catalyst, the method for making the catalyst, and a polymerization process for employing the catalyst.

In accordance with one aspect, this invention relates to an improved olefin polymerization catalyst produced by admixing a rare earth metal hydride, a ligand, and a Lewis acid. In accordance with another aspect, this invention relates to a catalyst system comprising a lanthanide-containing catalyst component and a cocatalyst comprising an organoaluminum compound. In accordance with still another aspect, this invention relates to the formation of mono-olefin polymers and conjugated diene polymers in the presence of a rare earth metal hydride-containing catalyst produced as set forth herein.

It is old in the field of olefin polymerization to prepare solid polymers by employing catalyst systems comprising a transition metal compound and an organometallic cocatalyst. It is also known that the productivity of such catalyst can generally be improved if the transition metal compound is employed in conjunction with another metal compound. Many of the prior art catalyst systems are relatively low in activity and, as a result, research continues in an effort to improve the catalyst systems with respect to production of olefin polymers. The present invention is concerned with new high productivity catalysts which employ rare earth metal hydrides as one of the components of the catalyst for the production of polymers from olefins.

Accordingly, an object of this invention is to provide an improved polymerization catalyst.

A further object of this invention is to provide an improved process for the production of olefin polymers.

Other objects, aspects, as well as the several advantages of the invention will be apparent to those skilled in the art upon reading the specification and the appended claims.

SUMMARY OF THE INVENTION

In accordance with the invention, a lanthanide-containing catalyst component is produced by admixing a rare earth metal hydride and Lewis acid and a ligand under such conditions that a suspension of these materials is obtained.

In accordance with another embodiment of the invention, a lanthanide-containing catalyst component is combined with an organo-aluminum catalyst component to form a catalyst composition suitable for the polymerization of olefins.

Further in accordance with the invention. olefins and especially alpha-olefins and conjugated dienes are polymerized under polymerization conditions employing the above catalyst.

DETAILED DESCRIPTION OF THE INVENTION

The lanthanide-containing component (component A) of the polymerization catalyst of the invention is formed from a rare earth metal hydride, a Lewis acid, and an electron donor ligand.

Thus, in accordance with the invention, an active catalyst for polymerizing alpha-olefins, conjugated dienes and vinyl monomers comprises a rare earth metal hydride associated with at least one electron donor ligand such as $C_2$–$C_{30}$ ligands selected from esters, ethers, ketones, polyamines, amides, phosphines, phosphites, phosphates, phosphoramides, sulfoxides, and the like, and treated with a Lewis acid, especially an aluminum halide, such as an aluminum chloride or bromide. This catalyst component is used with a cocatalyst comprising at least one organoaluminum compound (component B).

The rare earth metal hydride of catalyst component A can comprise any one of the rare earth metals of the lanthanide series, including those metals of atomic number ranging from 57–71.

The Lewis acid of catalyst component A comprises at least one of aluminum halide, tin tetrahalide, iron trihalide, boron trihalide, zinc dihalide, and the like. Examples of other suitable Lewis acids include tin tetrachloride, iron (ferric) trichloride, boron trifluoride etherate, zinc dichloride, and the like. Aluminum halides are preferred, but especially aluminum chloride and aluminum bromide including mixtures thereof.

Suitable organic electron donor ligands that can be used according to the invention include ethyl benzoate, methyl p-toluate, n-hexyl benzoate, n-dodecyl propionate, diethyl ether, di-n-butyl ether, di-n-octyl ether, tetrahydrofuran, dioxane, 2-octanone, benzophenone, ethylene diamine, diethylene triamine, N,N-dimethylacetamide, N-methyl-2-pyrrolidone, trimethyl phosphine, tri-n-butyl phosphine, triphenyl phosphine, trimethyl phosphite, triethyl phosphite, tri-n-butyl phosphite, triphenyl phosphite, tri-n-butyl phosphate, hexamethylphosphoric triamide, dimethyl sulfoxide, and the like, and mixtures thereof.

The mole ratio of ligand to lanthanide to be employed according to the invention is in the broad range of 1 to about 20, preferably in the range of 2 to about 10. The mole ratio of Lewis acid to lanthanide in catalyst component A is in the broad range of 0.1 to about 10, preferably in the range of about 1 to about 3.

The conditions under which the rare earth metal hydride, e.g., lanthanide hydride, ligand, and Lewis acid are contacted are a broad temperature range of about 25° to about 150° C., preferably a range of about 60° to about 100° C. for a period of time ranging from about 1 minute to about 72 hours, preferably about 10 minutes to about 24 hours.

The lanthanide hydride, Lewis acid and electron donor ligand compounds are normally mixed together in a suitable dry solvent or diluent. Typical solvents or diluents include, for example, normally liquid hydrocarbons having 3 to 12 carbon atoms as propane, n-pentane, cyclohexane, n-heptane, methylcyclohexane, toluene, xylenes, and the like, and mixtures thereof.

Generally the amount of solvent or diluent employed in the first step can vary over a broad range. Usually the amount of solvent or diluent is within the range of about 5/1 to about 300/1 grams of solvent per gram of rare earth metal hydride, preferably in the range of about 10/1 to about 100/1 grams solvent per gram rare earth metal hydride.

The three components used to prepare catalyst component A (Step 1) can be mixed in any order. For example, any two component can be mixed prior to introduction of the third component. It is likewise within the scope of this invention to combine all three components simultaneously in a reactor.

The lanthanide-containing catalyst components described above can be combined with an organoaluminum compound (Step 2) to form an active catalyst effective for the polymerization of olefins.

The organoaluminum compound used on Step 2 of the catalyst formation can be a compound having the formula $$AlR_nX_{3-n}$$

wherein R is a hydrocarbyl radical containing 1 to about 20 carbon atoms, X is a hydrogen, halogen, preferably chlorine or bromine, or alkoxide having 1–20 carbon atoms, and n is a number of 1 to 3. Thus suitable types of organoaluminum compounds are selected from trihydrocarbylaluminum, dihydrocarbylaluminum halide, hydrocarbylaluminum dihalide, dihydrocarbylaluminum hydride, dihydrocarbylaluminum alkoxide, hydrocarbylaluminum dialkoxide and the like, and mixtures thereof.

Examples of suitable specific organoaluminum compounds that can be used according to the invention include triethylaluminum, triisobutylaluminum, diethylaluminum hydride, diisobutylaluminum hydride, diethylaluminum chloride, diisobutylaluminum chloride, and the like, and mixtures thereof.

The organoaluminum compound is reacted with a solution of the product of step 1. Preferably, the hydrocarbon solution of the organoaluminum compound is combined with a solution of the product of step 1.

The organoaluminum cocatalyst is used in amounts ranging from about 10 to about 100 moles per mole of lanthanide hydride and in a preferred range of 20 to about 40 moles per mole of lanthanide hydride. It should be noted that each mole of ligand in the catalyst inactivates one mole of organoaluminum catalyst and, therefore, higher amounts of ligand will require higher amounts of organoaluminum catalyst. Thus, the mole ratio of organoaluminum cocatalyst to ligand is at least one and will preferably be in the range of about 2/1 to about 10/1 moles of organoaluminum per mole of ligand associated with the lanthanide hydride.

The temperatures employed in step 2 can vary over a wide range, generally being in the range of about 0° to about 150° C., and preferably about 25°–80° C. Following the combination of the organoaluminum compound and the solution of step 1, the composition is generally stirred or agitated for a sufficient time to insure complete mixing of the components, e.g., a few minutes to about 2 hours. After stirring is discontinued, the solids product is recovered by filtration or decantation, washed with a dry hydrocarbon such as n-heptane, etc., to remove any soluble material that may be present and optionally dried.

Suitable as the olefins which can be used herein are ethylene and conjugated diolefins, such as butadiene, isoprene, piperylene, 2,3-dimethylbutadiene, 2,4-hexadiene, and the like, and a mixture containing 2 or more of polymerizable unsaturated hydrocarbons as enumerated above. A particular group of the olefins to be polymerized according to the invention includes unsaturated hydrocarbons having 2 to 6 carbon atoms and having at least one polymerizable ethylene double bond.

These polymerizable monomers are polymerized by use of a catalyst composition of the present invention whereby a polymer with the various properties depending on the type of catalyst, monomer(s), and polymerization conditions employed, e.g., the type of solvent, polymerization temperature, polymerization pressure, etc., is obtained. Further, not only homopolymers can be produced from the polymerizable unsaturated monomer but also copolymers can be produced by employing a plurality of said monomers in accordance with the process of the present invention.

The polymerization reaction by use of a catalyst composition of the present invention can be carried out in the presence of a solvent or a diluent with advantages. Suitable as the solvent for the instant reaction system are inert hydrocarbons, e.g., butane, pentane, hexane, heptane, isooctane, cyclohexane, methylcyclohexane, benzene, toluene, xylene, tetralin, decalin, and other aliphatic, alicyclic, aromatic hydrocarbons, or mixtures thereof, or petroleum fractions free from polymerizable unsaturation.

The process for polymerizing olefins by use of a catalyst composition of the present invention can be carried out in a batch type, semi-continuous type, or continuous type reactor. Polymerization pressure can vary depending on the type of monomer, the catalytic activity of the catalyst system, the desired degree of polymerization, etc. Generally, the present polymerization reaction can be carried out at a temperature in the range of about 0° to about 200° C., preferably a temperature of about 25° to about 100° C. Polymerization pressure can be subatmospheric or superatmospheric pressure up to about 300 atmospheres and preferably from atmospheric pressure to about 100 atmospheres.

Generally, when using a solvent or diluent in the instant polymerization reaction, it is convenient to introduce olefin into a dispersion containing the catalyst of the present invention in the solvent or diluent. The catalyst composition can be added in its whole amount to the polymerization system at the start of the polymerization or it can be added portion-wise over the period for the polymerization.

In order to carry out the present invention by a continuous or semi-continuous process, the contact between catalyst and monomer can be effected by various ways. For example, the olefin can be contacted with the catalyst in the form of a fixed bed, a slurry, a fluid bed, or a movable bed.

In order to recover a produced polymer from the polymerization system, the crude polymerization product is, for example, taken up and subjected to solvent extraction, hot filtration under a pressure or centrifugal separation to yield a substantially pure polymeric product. A selection of the polymerization conditions for the process of the present invention, as well as the method for the recovery and purification of the polymeric product will be understood by those skilled in the art from the conventional low or modest pressure polymerization processes for olefins.

The following examples will serve to show the present invention in detail by way of illustration and not by way of limitation.

EXAMPLE I

This example demonstrates a procedure for preparing the inventive catalyst and its use in polymerizing 1,3-butadiene into high cis-1,4-polybutadiene.

Neodymium hydride (0.3 g), aluminum halide (variable), and ethyl benzoate (1.72 mL) were mixed with cyclohexane (10 mL) at reflux temperature overnight. The resulting suspension was employed with several organoaluminum compounds as cocatalyst in the polymerization of 1,3-butadiene.

Into a polymerization reactor were charged cyclohexane (200 mL), 1,3-butadiene (16 g), catalyst (variable) and organoaluminum cocatalyst (variable). The polymerization system was agitated in a constant temperature bath at 50° C. for three hours. Polymerization was terminated by addition of butylated hydroxytoluene (2 parts by weight per 100 parts by weight of polymer). The polymer was isolated by coagulation in isopropanol and drying in vacuo overnight at 60° C. Table I gives the variable employed in the catalyst preparation and the polymerization results.

TABLE I

| RUN | Catalyst | | Cocatalysts | | Conv. % | Cis %[b] | I.V.[c] | Gel %[c] |
|---|---|---|---|---|---|---|---|---|
| | AlX$_3$ | MHM[a] | ORG Al | MHM | | | | |
| 1[h] | AlBr$_3$ | 0.6 | DEALH[d] | 13.4 | 89 | 97 | — | 45 |
| 2[h] | AlBr$_3$ | 0.6 | DEALH | 20 | 94 | 97 | — | 41 |
| 3[h] | AlBr$_3$ | 0.6 | DEALH | 33.6 | 72 | 97 | — | 34 |
| 4[g] | AlBr$_3$ | 1.2 | TEA[e] | 9.4 | 0 | — | — | — |
| 5[g] | AlBr$_3$ | 1.2 | TEA | 28 | 24 | 97 | 10.2 | 58 |
| 6[g] | AlBr$_3$ | 1.2 | TEA | 47 | 68 | 97 | 5.9 | 63 |
| 7[h] | AlCl$_3$ | 0.6 | DIBALH[f] | 14.6 | 79 | 98 | — | 51 |
| 8[h] | AlCl$_3$ | 0.6 | DIBALH | 22 | 90 | 98 | — | 56 |
| 9[h] | AlCl$_3$ | 0.6 | DIBALH | 36.6 | 83 | 98 | — | 49 |
| 10[g] | AlCl$_3$ | 1.2 | TEA | 9.4 | 0 | — | — | — |
| 11[g] | AlCl$_3$ | 1.2 | TEA | 28 | 19 | 97 | 11.0 | 55 |
| 12[g] | AlCl$_3$ | 1.2 | TEA | 47 | 23 | 97 | 8.3 | 47 |

[a]Millimoles per hundred parts by weight of monomer (1,3-butadiene).
[b]Cis configuration in polymer determined as in U.S. Pat. No. 3,278,508, Col 20, lines 71ff and Col. 21, lines 1–21.
[c]Inherent viscosity and gel determined as in U.S. Pat. No. 3,278,508, Col. 20, notes a & b.
[d]Diethylaluminum hydride
[e]Triethylaluminum
[f]Diisobutylaluminum hydride
[g]Catalyst suspension used was 1.25 MHM of neodymium
[h]Catalyst suspension used was 0.625 MHM of neodymium The data in Table I show that polybutadiene with high inherent viscosity and high cis-1,4 configuration was prepared employing the inventive catalysts. Runs 4 and 10 demonstrate that using organoaluminum cocatalyst to lanthanide mole ratios below the above-specified broad range (7.5 in runs 4 and 10) does not result in an active catalyst.

EXAMPLE II

This example demonstrates the usefulness of the inventive catalysts prepared in Example I using either aluminum chloride or aluminum bromide for the polymerization of ethylene.

To a polymerization reactor containing cyclohexane (200 mL), catalysts from Example I (2 mL, 0.4 mmole of neodymium) and diethylaluminum hydride (11.2 mmole), ethylene was introduced at a constant pressure of 35 psig maintained at room temperature over a period of 40 hours. The polyethylene yields from catalyst made using aluminum chloride and aluminum bromide were 1 g and 3 g, respectively. The polyethylene had a melting point of 143° C., and a density of 0.96–0.97 g/cc.

I claim:

1. A process for the polymerization of olefins which comprises contacting at least one of 1,3 butadiene and ethylene under polymerization conditions with a catalyst composition consisting essentially of a component A formed by admixing a rare earth metal hydride, a Lewis acid selected from the group consisting of aluminum halide, tin tetrahalide, iron trihalide, boron trihalide, and zinc halide, and an electron donor ligand in a mole ratio of ligand to rare earth metal hydride of 1 to about 20 and a mole ratio of Lewis acid to rare earth metal hydride of 0.1 to about 10, and combining component A with a component B which is an organoaluminum compound with a mole ratio of organoaluminum to rare earth metal hydride ranging from about 10 to about 100 moles per mole and a mole ratio of organoaluminum compound to ligand of at least 1:1.

2. A process according to claim 1 wherein said organoaluminum cocatalyst is diethylaluminum hydride, diisobutylaluminum hydride, or triethyl aluminum.

3. A process for the production of high cis-1,4-polybutadiene which comprises contacting 1,3-butadiene under polymerization conditions with a catalyst composition consisting of a component A formed by admixing a rare earth metal hydride which is neodymium hydride, a Lewis acid which is aluminum chloride or aluminum bromide, and an electron donor ligand which is ethyl benzoate in a mole ratio of ligand to rare earth metal hydride of 2 to about 10 and a mole ratio of Lewis acid to rare earth metal hydride of 1 to about 3 and combining component A with an organoaluminum cocatalyst component B which is diethylaluminum hydride, diisobutylaluminum hydride or triethylaluminum in a mole ratio of organoaluminum to rare earth metal hydride ranging from about 10 to about 100 moles per mole and a mole ratio of organoaluminum compound to ligand of at least 1:1.

4. A process for the production of high density polyethylene which comprises contacting ethylene with a catalyst composition consisting of a component A formed by admixing a rare earth metal hydride which is neodymium hydride, a Lewis acid which is aluminum chloride or aluminum bromide, and an electron donor ligand which is ethyl benzoate in a mole ratio of ligand to rare earth metal hydride of 2 to about 10 and a mole ratio of Lewis acid to rare earth metal hydride of 1 to about 3 and combining component A with an organoaluminum cocatalyst component B which is diethylaluminum hydride, diisobutylaluminum hydride or triethylaluminum in a mole ratio of organoaluminum to rare earth metal hydride ranging from about 10 to about 100 moles per mole and a mole ratio of organoaluminum compound to ligand of at least 1:1.

* * * * *

UNITED STATES PATENT AND TRADEMARK OFFICE
CERTIFICATE OF CORRECTION

PATENT NO. : 4,699,962

DATED : 10/13/87

INVENTOR(S) : Henry L. Hsieh et al

It is certified that error appears in the above-identified patent and that said Letters Patent is hereby corrected as shown below:

Column 5, line 56 through column 6, line 6 claim 1 should read:

A process for the polymerization of olefins which comprises contacting at least one of 1,3-butadiene and ethylene under polymerization conditions with a catalyst composition consisting essentially of a component A formed by admixing a rare earth metal hydride which is neodymium hydride, a Lewis acid selected from the group consisting of aluminum bromide and aluminum chloride, and an electron donor ligand which is ethyl benzoate in a mole ratio of ligand to rare earth metal hydride of 1 to about 20 and a mole ratio of Lewis acid to rare earth metal hydride of 0.1 to about 10, and combining component A with component B which is an organoaluminum compound with a mole ratio of organoaluminum to rare earth metal hydride ranging from about 10 to about 100 moles per mole and a mole ratio of organoaluminum compound to ligand of at least 1:1.

Signed and Sealed this

Twenty-seventh Day of September, 1988

Attest:

DONALD J. QUIGG

*Attesting Officer*  *Commissioner of Patents and Trademarks*